United States Patent
Licht

(10) Patent No.: US 10,740,801 B2
(45) Date of Patent: Aug. 11, 2020

(54) PROMOTION BASED ON ITEM INTERACTION

(71) Applicant: NCR Corporation, Duluth, GA (US)

(72) Inventor: Yehoshua Zvi Licht, Alpharetta, GA (US)

(73) Assignee: NCR Corporation, Atlanta, GA (US)

( * ) Notice: Subject to any disclaimer, the term of this patent is extended or adjusted under 35 U.S.C. 154(b) by 205 days.

(21) Appl. No.: 15/471,012

(22) Filed: Mar. 28, 2017

(65) Prior Publication Data
US 2018/0285913 A1    Oct. 4, 2018

(51) Int. Cl.
*G06Q 30/02* (2012.01)

(52) U.S. Cl.
CPC ..... *G06Q 30/0269* (2013.01); *G06Q 30/0207* (2013.01); *G06Q 30/0239* (2013.01); *G06Q 30/0251* (2013.01); *G06Q 30/0255* (2013.01); *G06Q 30/0261* (2013.01); *G06Q 30/0267* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,176,224 A | * | 1/1993 | Spector | A47F 10/02 186/52 |
| 7,797,374 B2 | * | 9/2010 | Prince | G06Q 30/02 709/203 |
| 7,805,319 B2 | * | 9/2010 | Badinelli | G06F 19/324 705/2 |
| 2009/0125396 A1 | * | 5/2009 | Otto | G06Q 10/087 705/14.26 |
| 2013/0188217 A1 | * | 7/2013 | Kluth | G06F 8/61 358/1.14 |
| 2015/0262230 A1 | * | 9/2015 | Cypher | G06Q 30/0251 705/14.49 |

* cited by examiner

*Primary Examiner* — Alexandru Cirnu
(74) *Attorney, Agent, or Firm* — Schwegman, Lundberg & Woessner

(57) ABSTRACT

Disclosed herein are systems and methods for providing a promotion or incentive. The systems and methods may include detecting, by a computing device comprising a processor, that a consumer has evaluated a product. The product located at a retail store. The systems and methods may also include providing, by the computing device, an incentive to the consumer to purchase the product based on an amount of time the consumer has evaluated the product within the store.

8 Claims, 3 Drawing Sheets

PROMOTION BASED ON ITEM INTERACTION

BACKGROUND

Traditionally, coupons are sent to customers via postal mail or email. Coupons can also be given to customers upon checkout. The coupons can be used to reward loyal customers or to otherwise try and get customers to purchase products. However, currently, there is no way to give customers coupons or otherwise provide customers with an incentive to purchase an item based on the customer interacting with the item in the store.

SUMMARY

Disclosed herein are systems and methods for providing a promotion or incentive. The systems and methods may include detecting, by a computing device comprising a processor, that a consumer has evaluated a product. The product located at a retail store. The systems and methods may also include providing, by the computing device, an incentive to the consumer to purchase the product based on an amount of time the consumer has evaluated the product within the store.

BRIEF DESCRIPTION OF THE FIGURES

The above-mentioned and other features and advantages of this invention, and the manner of attaining them, will become more apparent and the invention itself will be better understood by reference to the following description of embodiments of the invention taken in conjunction with the accompanying drawings, wherein.

Corresponding reference characters indicate corresponding parts throughout the several views. The exemplifications set out herein illustrate exemplary embodiments of the invention, and such exemplifications are not to be construed as limiting the scope of the invention any manner.

DETAILED DESCRIPTION

Figure 1:
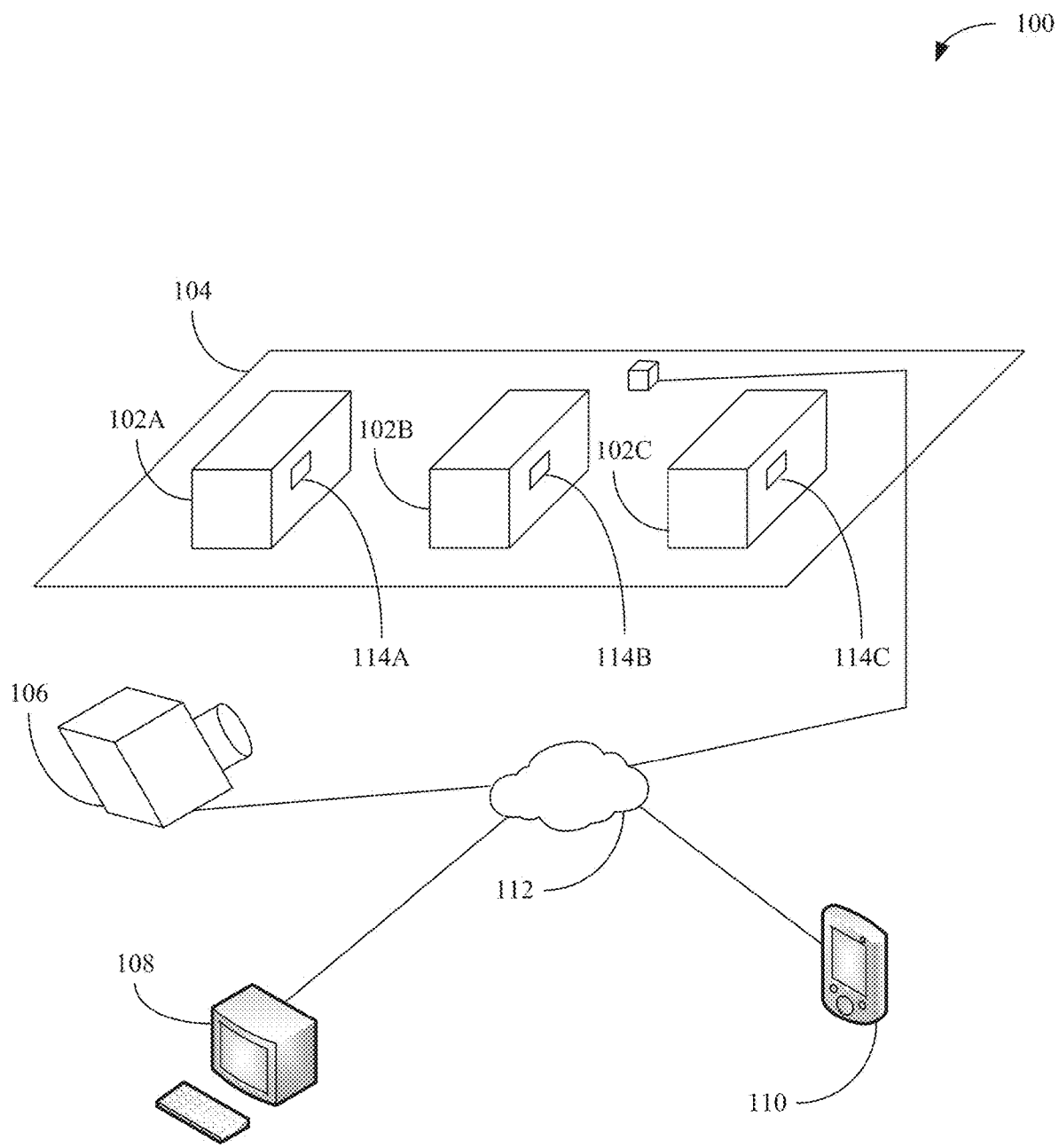
FIG. 1 shows an example system diagram for a providing a promotion based on item interaction consistent with the disclosure.

The following detailed description refers to the accompanying drawings. Wherever possible, the same reference numbers are used in the drawings and the following description to refer to the same or similar elements. While embodiments and examples are described, modifications, adaptations, and other implementations are possible. For example, substitutions, additions, or modifications may be made to the elements and stages illustrated in the drawings, and the systems and methods described herein may be modified by substituting, reordering, or adding stages to the disclosed methods or elements to the disclosed systems. Accordingly, the following detailed description does not limit the disclosure. Instead, the proper scope of any invention disclosed herein is defined by the appended claims.

Today in traditional brick and mortar stores, a recommendation or promotion for a product is done only at a last interaction with a customer. Stated another way, only when the customer is checking out does a retailer provide the customer with a customized recommendation or promotion. The problem with providing promotions or recommendations at checkout is that the customer's activities within the store are not taken into account in selecting the promotions or recommendations. The term recommendations and promotions may be used interchangeably throughout this disclosure.

As disclosed herein, cameras and other sensors may be used to monitor the customer's interactions with products within the store. Based on the interactions, custom promotions and recommendations may be provided in real time. The recommendations or promotions can be delivered to the customer's mobile device.

For example, as a customer browses through a brick and mortar store, sensors and cameras located throughout the store may monitor the customer's location and track time spent within various departments. In addition, the sensors and cameras may identify products with which the customer interacts. Based on the interactions, a computing device can provide customized recommendations or promotions to the customer's mobile device.

Turning now to the figures, FIG. 1 shows an example schematic of a system 100 for providing recommendations or promotions consistent with embodiments disclosed herein. The system 100 may include one or more products 102A, 102B, and 102C (collectively products 102) located on a shelf 104 (or anywhere within a brick and mortar retail store), a sensor 106, and a computing device 108. The computing device 108 may communicate with the sensor 106 and a portable computing device 110 via a network 112. Each of the products 102 may also include a sensor 114A, 114B, and 1140 (collectively sensors 114) and a sensor 116 may be located on or proximate the shelf 104.

The products 102 can be the same product or different products. For example, the products 102 may be different brands of a similar item such as different brands of cookies. The products 102 may be different sizes of an item such as 1 liter, 2 liters, and 12 packs of soda.

The sensors 106, 114, and 116 can be any type of sensor that can be used to detect the portable computing device 110 or movement of the products 114. For example, the sensors 106 can be a camera, radio frequency identification (RFID) sensors, Bluetooth® beacons, near-field-communication (NFC) sensors, etc.

The portable computing device 110 may be a cellphone or other device carried h the consumer. The mobile device 110 may also be a printer or other device maintained by the retailer located proximate the products 102. For example, the portable computing device 110 may be a table or other computing device with a screen that can display a barcode or other coupon the customer can scan with his or her cellphone. As such, the retailer can position the mobile computing device 110 at different locations within the store depending on product placement or traffic flow patterns within the store. During operation, the portable computing device 110 may receive the promotion from the computing device 108.

Figure 2:
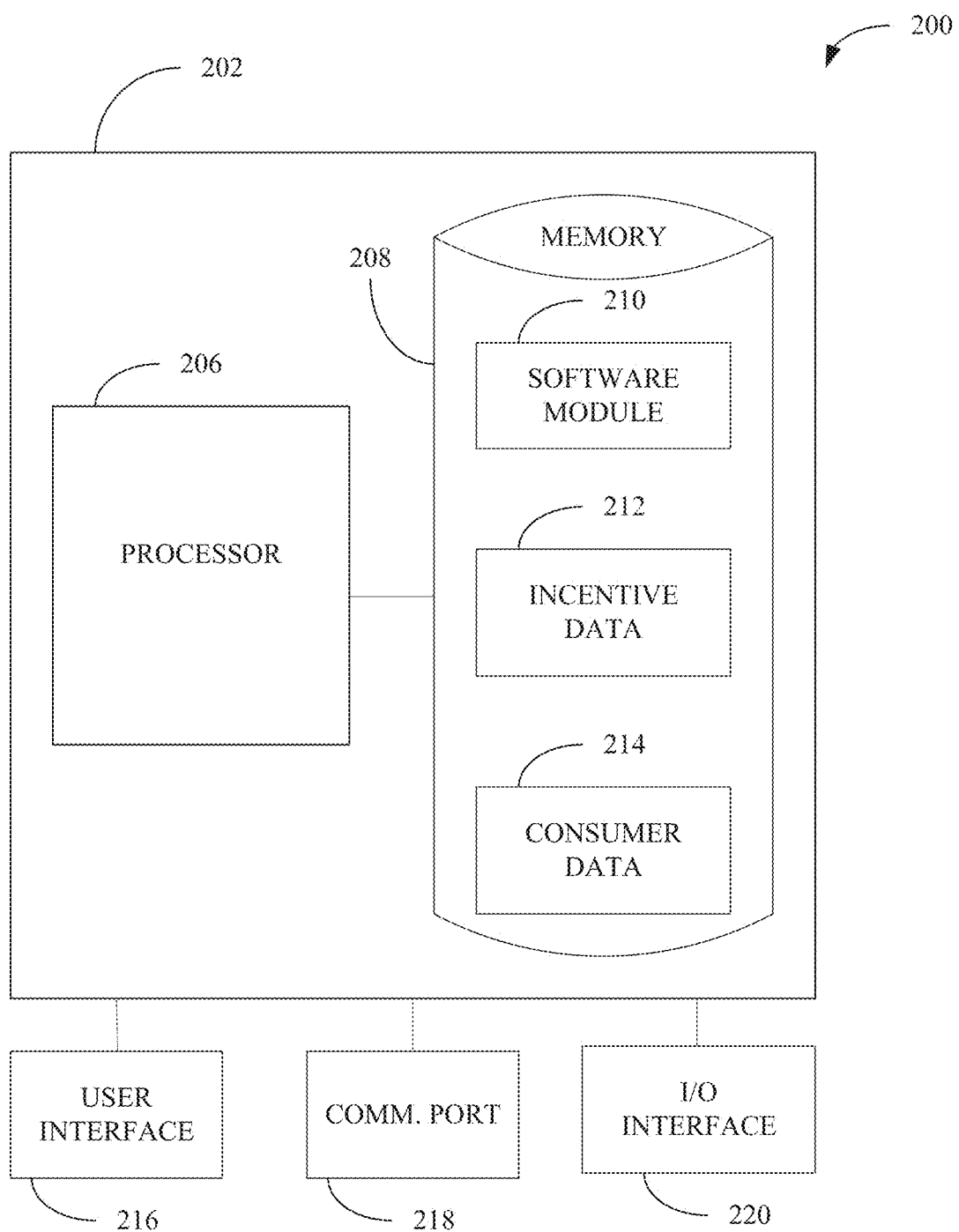
FIG. 2 shows an example computing device consistent with the disclosure.

FIG. 2 shows an example schematic of computing device 200 consistent with embodiments disclosed herein. The computing device 200 may be the computing device 108 or the mobile computing device 110. As such, the computing device 200 may be transported around or remain stationary. The computing device 200 may be remote to the store as well. For example, the computing device 108, which is represented schematically as computing device 200, may be a remote server located at an offsite data facility operated by the retailer or an advertiser or producer of products that contracts with the store to run promotions or otherwise offer incentives to consumers that shop within the store.

The computing device 200 may include a computing environment 202, which may include a processor 206 and a memory unit 208. The memory unit 208 may include a software module 210, incentive data 212, and consumer data 214. The incentive data 212 may include a listing of promotions, dollar values to be offered to consumers as incentives, time periods for running various incentive programs, etc. The consumer data 214 may include the user profiles, product search histories, payment information, user preferences, etc. While executing on the processor 206, the software module 210, the incentive data 112, and the consumer data 214 may perform processes for providing incentives or promotions to a consumer, including, for example, one or more stages included in method 300 described below with respect to FIG. 3.

The computing device 200 may also include a user interface 216. The user interface 216 may include any number of devices that allow a user to interface with the computing device 200. Non-limiting examples of the user interface 216 may include a keypad, a microphone, a speaker, a display (touchscreen or otherwise), etc.

The computing device 200 may also include a communications port 218. The communications port 218 may allow the computing device 200 to communicate with information systems such as those operated and maintained by the consumers 102, retailers 104, miners 106, and the central administrator 114. Non-limiting examples of the communications port 218 may include, Ethernet cards (wireless or wired), Bluetooth® transmitters and receivers, near-field communications modules, cellular modules, etc.

The computing device 200 may also include an input/output (I/O) device 220. The I/O device 220 may allow the computing device 200 to receive and output information. Non-limiting examples of the I/O device 220 may include, a camera (still or video), a printer, a scanner, etc.

Figure 3:
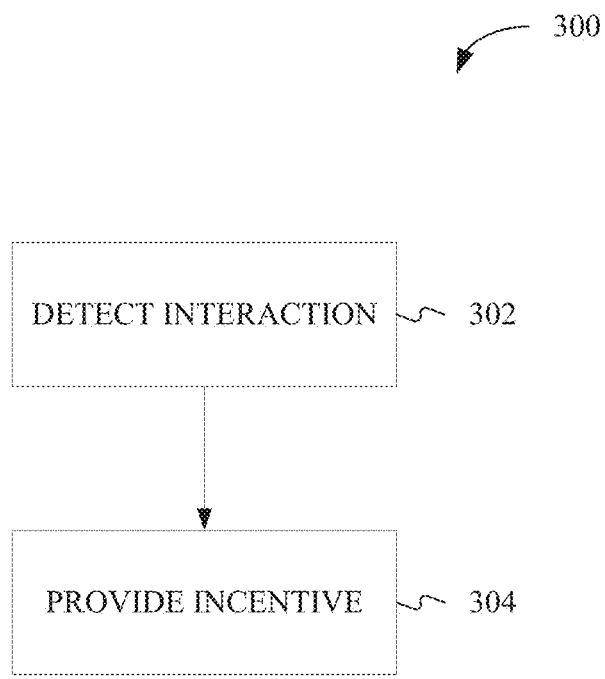
FIG. 3 shows a method consistent with the disclosure.

FIG. 3 shows a method 300 for providing a promotion or incentive to a consumer consistent with embodiments disclosed herein. The method may begin at stage 302 where an interaction between a customer and an item can be detected. As disclosed herein, determining that an interaction between a customer and an item can be detected using the sensors 106, 114, and 116. For example, the sensors 106 can monitor a position of the items 102 a position change can represent an interaction with the item.

The customer and the item can be identified using sensor 106. For example, sensor 106 may be a camera and may transmit images of the customer and the item to the computing device 106. The computing device 106 may perform an image analysis to determine the customer's identity and what product the customer is interacting with. For instance, the sensor 106 may transmit an image of the consumer to the computing device 106, which may in turn access a database of customer profiles that include a picture of the customer. The computing device 106 may perform an image analysis of the image with against the images stored in the customer profiles to determine a match. The same image analysis may also be performed with an image of the product and a database of images of products within the store. In addition, movement of a product may be performed by an image analysis of two images of the shelf 104 taken at different time intervals. For example, a picture of the shelf 104 may be taken every five minutes by the sensor 106 and an image analysis on two separate images may reveal that an item has been moved and a customer within one of the images or a third image captured in close proximity in time may be used to identify the customer.

Once an interaction has been determined to have occurred, the method 300 may advance to stage 304 where an incentive may be provided to the consumer. For example, the computing device 108 may transmit an incentive to the portable computing device 110. The incentive may be an electronic coupon offering a fixed dollar amount (e.g., $0.50 or $1.00) or a percentage (e.g., 10% or 25%) discount for purchasing the item.

The incentive may be for the item the customer has interacted with or may be for a comparable item. For example, the computing device 108 may search a purchase history of the consumer and select a second product from the purchase history that may be listed in the product history and that may be comparable to the item with which the consumer interacted. The incentive may be a coupon for the second item. In addition, the incentive may be a first coupon for the first item and a second coupon for the second item. The value of the incentive may be greater for the second coupon than the first coupon. For example, the second item may be a store brand and the second coupon may give 20% off of the second item and the first item may be a name brand and the first coupon may give 10% off of the first item.

In addition, the computing device can determine if the consumer rejects an incentive and provide a second incentive. For example, a first incentive can be sent to the consumer while the consumer is holding the item. The computing device 108 can determine that the consumer rejected the first incentive by determining that the consumer put the item back on the shelf 104. Once the consumer rejects the incentive, the computing device 108 can transmit a second incentive to the consumer. The second incentive can provide a greater discount for the item and/or recommend a second item that is similar to the first item to the consumer.

The first incentive provided to the consumer may be for an alternate product. For example, the consumer may have listed food allergies or other preferences in a consumer profile. The computing device 108 may compare a list of ingredients of the product the consumer has interacted with to the list of food allergies or preferences. Based on the comparison, the computing device 108 may determine that the consumer may have an allergic reaction or otherwise dislike the product and suggest a second product and an incentive for the second product. For instance, the consumer may have a gluten allergy and a pasta the consumer is evaluating may not be gluten free. As a result, the computing device 108 may transmit an incentive to a second pasta that is gluten free and provide a warning to the consumer that the initial pasta the consumer was evaluating is not gluten free.

In providing the incentives, an electronic coupon can be transmitted to and displayed on the mobile device 110. For example, if the mobile device 110 is a cellphone of the consumer, the computing device 108 can transmit the electronic coupon to the mobile device 110 and the consumer can show the electronic coupon to a cashier at checkout. The mobile device 110 can also be a printer maintained by the retailer. As such, when the incentive is transmitted, the mobile device 110 may print a physical coupon that the consumer can take to a cashier.

The image analysis used to determine the item with which the consumer interacts can be simplified by knowing which items within a store the sensor 106 is located near. For example, when setting up the sensor 106, the sensor 106 can be associated with pastas. Thus, when an image is received from sensor 106, the computing device 108 may know to begin the image analysis by pulling images of pastas from a database associated with the computing device 108.

It will be readily understood to those skilled in the art that various other changes in the details, material, and arrangements of the parts and method stages which have been described and illustrated in order to explain the nature of the inventive subject matter may be made without departing from the principles and scope of the inventive subject matter as expressed in the subjoined claims.

What is claimed is:

1. A system for providing an incentive, the system comprising:
    a plurality of cameras located within a retail store;
    a sensor located proximate a product;
    a printer located proximate a shelf within the retail store and the printer located within the retail store base on a traffic flow pattern within the retail store;
    a computing device in communication with the plurality of cameras and the printer, the computing device operative to:
        receive, from the plurality of cameras, a plurality of images of a consumer located proximate the shelf, the shelf containing the product,
        receive a plurality of consumer profiles that includes known images of consumers;
        determine identity of the consumer using the plurality of images of the consumer located proximate the shelf and the known images of consumers, wherein determining the identity of the consumer includes performing image analysis of the plurality of images of the consumer against the known images of consumers,
        detect that the consumer has evaluated the product, wherein detecting that the consumer has evaluated the product includes the computing device operative to:
            receive a signal from the sensor when the consumer is proximate the sensor, and
            perform image analysis of the plurality of images of the consumer against known images of products in the retail store to identify the product from a plurality of products the consumer has evaluated, and
        transmit, to the printer, an incentive to purchase the product; and
    the printer operative to:
        receive, from the computing device, the incentive, and
        print the incentive, the incentive including a coupon including a barcode that is scannable.

2. The system of claim 1, further comprising determining a time the consumer has evaluated the product, wherein determining the time includes:
    receiving a first image of the product captured at a first time showing the product in a first location;
    receiving a second image of the product captured at a second time showing the product in a second location, the second time being after the first time, a second location being different than the first location; and
    determining a change in location based on the first location and the second location.

3. The system of claim 1, wherein the operations further cause the processor to:
    determine that the consumer has rejected the incentive; and
    transmit a second incentive to the consumer upon determining that the consumer has rejected the incentive.

4. The system of claim 3, wherein the second incentive includes a recommendation for a second product.

5. The system of claim 1, wherein the indication that the consumer has evaluated the product includes the consumer holding the product.

6. The system of claim 1, wherein the instructions further cause the processor to:
    search a purchase history of the consumer;
    select a second product, the second product being listed in the purchase history; and
    transmit a second incentive to the consumer for the second product.

7. The system of claim 1, wherein the instructions further cause the processor to:
    compare ingredients of the product to a list of allergies of the consumer stored in a user profile; and
    transmit an alert to a portable device when one of the ingredients matches an allergy on the list of allergies.

8. The system of claim 7, wherein the instructions further cause the processor to:
    identify a second product that does not contain the allergy on the list of allergies; and
    transmit an incentive for the second product to the portable device.

* * * * *